UNITED STATES PATENT OFFICE.

ALBRECHT SCHMIDT, GUSTAV KRÖNLEIN, AND ERNST RUNNE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

CARBAZOL-SULFONIC ACIDS AND PROCESS OF MAKING SAME.

1,128,369.     Specification of Letters Patent.     Patented Feb. 16, 1915.

No Drawing.     Application filed April 24, 1913. Serial No. 763,397.

*To all whom it may concern:*

Be it known that we, ALBRECHT SCHMIDT, Ph. D., chemist, GUSTAV KRÖNLEIN, Ph. D., chemist, and ERNST RUNNE, Dr. Ing., chemist, citizens of the Empire of Germany, residing at Höchst-on-the-Main, Germany, have invented certain new and useful Improvements in Carbazol-Sulfonic Acids and Processes of Making Same, of which the following is a specification.

Of the sulfonic acids of carbazol and its derivatives there have hitherto been known only the polysulfonic acids and up to the present attempts to prepare a monosulfonic acid of said compound were unsuccessful. (Compare *Berichte* 1911, page 234.) Now we have found that by causing sulfuric acid or fuming sulfuric acid (both to be comprised under the term "strong sulfuric acid") to act upon carbazol, etc., in an indifferent solvent, a monosulfonic acid of said bodies is obtained corresponding to the general formula:

$$C_{12}H_7(NX).SO_3R$$

wherein X stands for the series: H, methyl, ethyl, etc.; and R for a cation, such as H, K, Na, (NH$_4$), etc. Said monosulfonic acid constitutes a valuable parent material for the manufacture of dyestuffs.

The following example illustrates our invention: 16.7 kilos of carbazol, or the corresponding quantity of methyl-carbazol or ethyl-carbazol, are finely divided in 15–20 times the quantity of nitrobenzene and gradually mixed with 9.5 kilos of fuming sulfuric acid containing 20% of sulfuric anhydrid, while cooling. This mixture is stirred for some hours at a somewhat higher temperature, whereupon the nitrobenzene is shaken out with water and the sulfonic acid isolated in the usual manner from the aqueous solution.

The sodium salt of the carbazol-sulfonic acid $$C_{12}H_7(NH)SO_3H,$$

is not very readily soluble in water and crystallizes therefrom as colorless, brilliant leaflets, the sodium salts from the alkyl-carbazols being readily soluble.

These carbazol-sulfonic acids are soluble in water; when combined with p-nitrosophenol and concentrated sulfuric acid, they yield blue indophenolsulfonic acids which are remarkable for their solubility in water, wherein they dissolve with a blue color, the solutions in aqueous alkalis or in alcohol being of a reddish-violet color.

Having now described our invention what we claim is:

1. The process of manufacturing carbazol-sulfonic acids, being substantially carbazol-monosulfonic acids of the general formula:

$$C_{12}H_7(NX).SO_3R$$

wherein X stands for the series: H, methyl, ethyl, alkyl and R for a cation, which consists in treating a carbazol with strong sulfuric acid in presence of an indifferent solvent.

2. As new products, the carbazol-sulfonic acids of the general formula:

$$C_{12}H_7(NX).SO_3R$$

wherein X stands for the series: H, methyl, ethyl, alkyl; and R for a cation, being obtainable by treating a carbazol with strong sulfuric acid in presence of an indifferent solvent, said product being soluble in water and yielding with p-nitrosophenol and concentrated sulfuric acid indophenolsulfonic acids, which are soluble in water with a blue color, in aqueous alkalis with a reddish-violet color.

3. As a new product, the carbazol-sulfonic acid, being substantially a carbazol-monosulfonic acid of the formula:

$$C_{12}H_7(NH).SO_3H$$

soluble in water, forming a sodium salt which crystallizes as colorless brilliant leaflets from its aqueous solution, and yielding, when combined with nitrosophenol and concentrated sulfuric acid, a blue indophenolsulfonic acid which is soluble in water with a blue color, in dilute alkalis and in alcohol with a reddish-violet color.

In testimony whereof, we affix our signatures in presence of two witnesses.

ALBRECHT SCHMIDT.
    GUSTAV KRÖNLEIN.
    ERNST RUNNE.

Witnesses:
    JEAN GRUND,
    CARL GRUND.